United States Patent Office 3,530,203
Patented Sept. 22, 1970

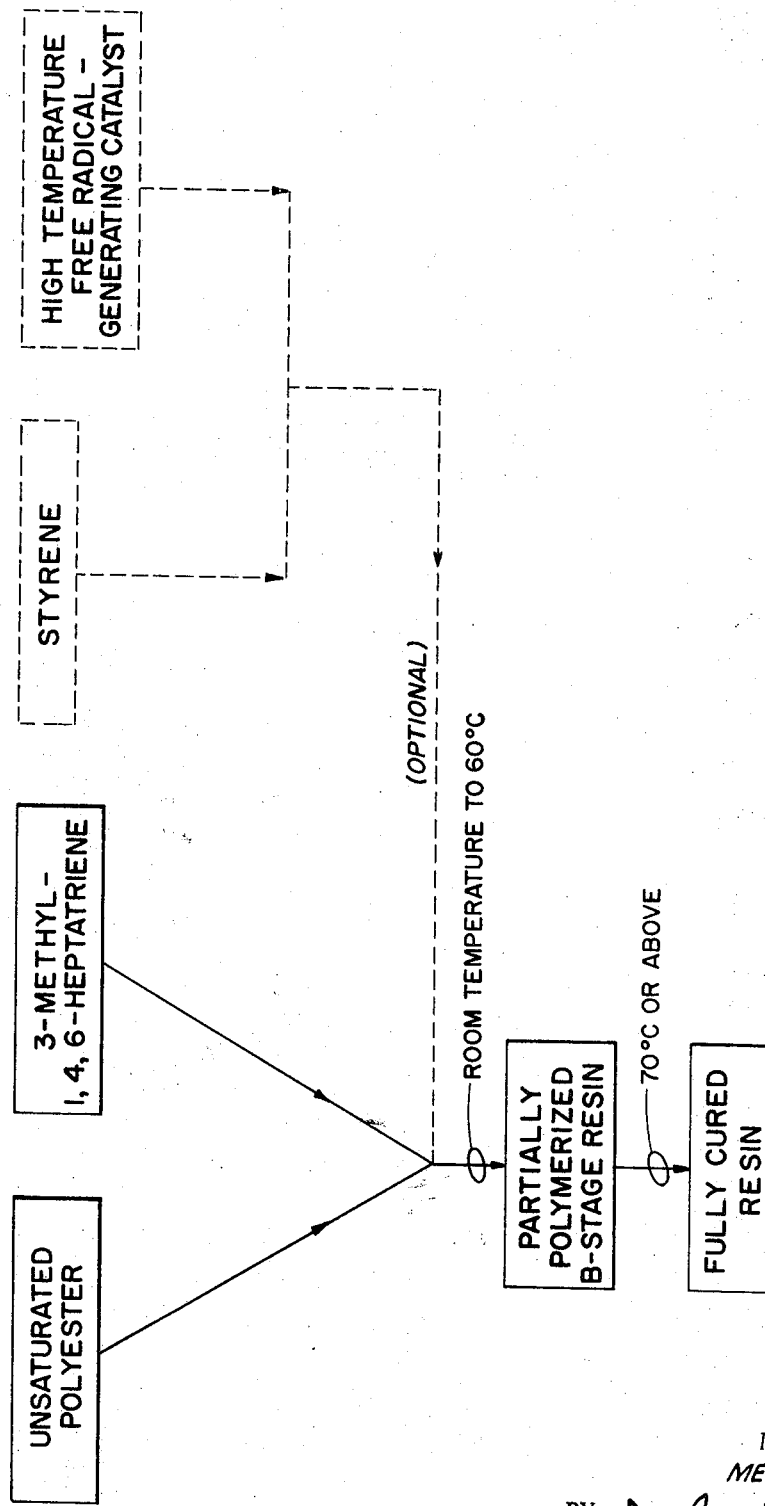

3,530,203
HEPTATRIENE CONTAINING POLYESTER RESIN COMPOSITION HAVING LONG B-STAGE STORAGE LIFE
Melvin E. Baum, Monroeville, Pa., assignor to Koppers Company, Inc., a corporation of Delaware
Filed Aug. 3, 1967, Ser. No. 658,074
Int. Cl. C08f 11/02
U.S. Cl. 260—861
4 Claims

ABSTRACT OF THE DISCLOSURE

An unsaturated polyester resin system having rapid gel time at lower temperatures is formed from a phthalic-maleic-glycol unsaturated polyester and monomeric 3-methyl-1,4,6-heptatriene. The resin in the gel or B-stage has long storage life, yet is quickly cured when subjected to temperatures above about 70° C. The system may be used with or without the use of conventional ethylenically unsaturated copolymerizable monomers such as styrene.

BACKGROUND OF THE INVENTION

Cured unsaturated polyester resins which have been reinforced by fibrous materials such as glass fiber mats or the like have excellent physical strength characteristics. However, the formation of shaped objects with such materials has presented problems because the fibers initially immersed within the uncured liquid resin tend to rise to the surface causing the object, after curing of the resin, to have irregularities in the surface.

To avoid this problem, preforms have been made by spraying glass fibers onto screens similar in shape to the final desired product. Air is sucked through the screen to hold the fibers in place. A binder is then sprayed over the fibers and cured to hold the fibers together in the desired form. The form is then placed into a mold and the unsaturated polyester resin is poured into the mold and cured therein. The resin must be viscous enough to adhere to the form, yet not so viscous as to prevent proper wetting of the fibers.

To overcome the foregoing cumbersome and critical process, it has been proposed to coat the glass fibers with the uncured unsaturated polyester resin liquid to thoroughly wet the fiber. The liquid resin is then thickened, without actually curing the resin, by chemical or physical means. The physical means include: (1) driving off a volatile solvent in which a viscous polyester resin has been dissolved, or (2) using a heated viscous polyester resin and then cooling the coated fibers after application. The chemical means include: (1) the addition of a thickening agent such as MgO to the polyester resin, or (2) the partial copolymerization or curing of the resin to a gelled or B-stage.

However, such systems each have certain economic drawbacks. The solvent system, of course, results in loss of the solvent plus disposal of the fumes. Heating viscous polyesters to reduce their viscosity is costly and cumbersome. Chemically thickening the polyester resin such as by the addition of MgO or $Mg(OH)_2$ as shown in U.S. Pat. 2,568,331, issued to Vincent Frilette results in an eventual viscosity build-up; however, one of its drawbacks is that the initial thickening rapidly builds up the viscosity which reduces the pot-life of the resin. Another difficulty encountered is the slow overall build-up of the viscosity of the resin. Resins modified to rapidly cure to a B-stage normally have a tendency to continue to cure or harden beyond the B-stage within a short period of time.

I have discovered an unsaturated polyester resin which will rapidly gel at lower temperatures to a non-tacky, yet flexible state and remain in such a state for an extended period of time. The resin can later be cured upon subsequent exposure to higher curing temperatures.

SUMMARY OF THE INVENTION

In accordance with the invention, there is provided an unsaturated polyester resin capable of rapidly gelling at temperatures below about 60° C. to a non-tacky, yet flexible state and which may be subsequently cured at higher temperatures comprising: (a) 50–90% by weight of the condensation product of (1) at least one dicarboxylic acid containing $\alpha,\beta$-ethylenic unsaturated, polyesterified with (2) at least one dihydric alcohol and (b) 10–50% by weight of at least one copolymerizable, ethylenically unsaturated monomer having both conjugated and non-conjugated $\alpha,\beta$-ethylenic unsaturation.

DETAILED DESCRIPTION

Condensation polymers useful in forming the rapid gelling unsaturated polyester resin of the invention are formed by the polyesterification of dicarboxylic acids or their anhydrides with dihydric alcohols. Such condensation polymers or unsaturated polyesters are well known in the art and are described, for example, in U.S. Pat. 2,255,313 isued to Carleton Ellis. To form the polyesters, aproximately equi-molar proportions of the dicarboxylic acids and the dihydric alcohols are used.

At least a portion of the dicarboxylic acids used in the polyesterification must contain $\alpha,\beta$-ethylenic unsaturation. Examples of such unsaturated dicarboxylic acids include maleic and fumaric acids. The remainder of the dicarboxylic acids are usually either saturated normal aliphatics such as adipic acid, succinic acid or the like, or aromatic diacids such as phthalic acid, isophthalic acid or the like.

Examples of the dihydric alcohols used in the polyesterification are ethylene glycol, 1,2-propane diol; and the ether glycols such as diethylene glycol, dipropylene glycol, and the like. The cyclic glycols such as 1,4-cyclohexane diol or the adducts or reaction products of alkylene oxides with bis-phenol A are also well known constituents of polyesterification products which may be used in the unsaturated polyester resin of the invention.

The novel resins of the invention are made by mixing the condensation polymer or polyester with a copolymerizable ethylenically unsaturated monomer system, at least a portion of which is a monomer containing both conjugated and non-conjugated $\alpha,\beta$-ethylenic unsaturation. The preferred monomer is 3-methyl-1,4,6-heptatriene having the formula:

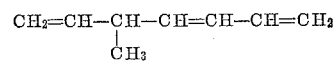

The mixture is generally refered to as a polyester resin and the use of the term polyester resin in this specification is intended to define a mixture of unsaturated polyester and copolymerizable monomer.

The polyester resin of this invention contains 50–90% by weight unsaturated polyester and 10–50% by weight 3-methyl-1,4,6-heptatriene. In some instances, a portion of the heptatriene may be replaced by a second monomer such as styrene, vinyl toluene or the like. However, even when a second monomer is used at least 10% by weight heptatriene must be used. The total monomer content of the resin should not exceed 50% by weight whether heptatriene is used alone or in combination with a second monomer.

In conventional polyester resins ethylenically unsaturated monomers such as styrene act as a solvent for the polyesterified condensation product, as well as a co-reactant in the subsequent copolymerization or curing which results in the formation of a cross-linked thermoset product. This copolymerization occurs between the double bonds in the unsaturated polyester and in the monomer. It is common practice, when copolymerizing, with a monomer such as styrene, to initiate the copolymerization with a free radical generating catalyst such as an organic peroxide. Until such initiation, the copolymerization does not occur and hence, the dual role of solvent as well as copolymerizable monomer is utilized by the producer by shipping the polyester dissolved in monomers such as styrene to the user who then adds the polymerization initiator just prior to use.

However, when 3-methyl-1,4,6-heptatriene is used in accordance with the invention, such procedures cannot be used. By a reaction mechanism, not completely understood, the 3-methyl-1,4,6-heptatriene apparently will at least partially copolymerize at ambient temperatures with the unsaturated polyester without the addition of any initiator. Complete polymerization does not occur, however, at this time. Complete polymerization occurs when additional heat is supplied to generate free radicals or when a high temperature free radical generating catalyst is effected by heat to break-down and generate free radicals. This two-stage polymerization may well be due to different degrees of reactivity of the several double bonds within the 3-methyl-1,4,6-heptatriene structure. It should be noted in this regard that the 4 and 6 position double bonds are in conjugated positions and the 1 position double bond is not. This apparent difference in reactivity may also explain the long B-stage storage life attainable with the resin of the invention in comparison with conventional resins.

As a result of the difference in function of the unsaturated polyester resin of the invention from that of conventional unsaturated polyester resin, special preparation and handling of the resin of the invention is necessary. In the preferred embodiment, this may be done by preparing an unsaturated polyester resin by dissolving an unsaturated polyester in a conventional monomer such as styrene and then adding the 3-methyl-1,4,6-heptatriene in the field before use and desired gel. For example, when 10% by weight 3-methyl-1,4,6-heptatriene and 20% by weight styrene are used, gelation will occur at room temperature within 24 hours after the addition of the heptatriene and within several hours at about 60° C.

An alternate embodiment is to omit the conventional monomer and to use only the polyester and 3-methyl-1,4,6-heptatriene. This procedure is somewhat dependent upon the formulation of the polyester due to handling problems. Unless a very high molecular weight polyester is used, the polyester, as a heavy viscous liquid, presents handling difficulties in eventual mixing in the field by the user and with the heptatriene monomer. High molecular weight polyester (2500 or more) are solids which are grindable and may be shipped in granulated form to be mixed with the heptatriene by the user. In either case, of course, the polyester may also be dissolved in a volatile inert solvent such as xylene. After mixing the dissolved polyester with the heptatriene in the field, the inert volatile solvent can then be allowed to evaporate.

In another embodiment, the polyester can be initially dissolved in the 3-methyl-1,4,6-heptatriene by the producer and allowed to partially copolymerize. The solid, partially polymerized, polyester resin may then be ground and shipped as a powder. The user then completes the polymerization by exposing the powder to a high temperature (about 70° C. or higher) for example, in a molding press.

As mentioned, previously the polyester resin of the invention may be cured with or without a free radical generating catalyst. However, it is advantageous to use such a catalyst to accelerate the final cure of the polyester resin and to insure that the resin is fully cured. The catalyst, of course, must be insensitive to lower temperatures, i.e., temperatures below about 60° C. so as to not interfere with the initial gelation of the resin. High temperature free radical generating catalysts which are relatively inert at lower temperatures are available. Examples of high temperature catalysts which generate free radicals and are suitable for use in this invention include:

Cumene hydroperoxide,
Pinane hydroperoxide,
p-Menthane hydroperoxide,
t-Butyl hydroperoxide,
2,5-dimethylhexane-2,5-dihydroperoxide,
Dicumyl peroxide,
Di-t-butyl peroxide,
Tert-butyl perbenzoate, and
2,2'-azobisbutyronitrile.

The non-tacky, yet flexible state or B-stage which the polyester resin of the invention initially reaches is defined herein as an intermediate stage of polymerization wherein from 2–80% of the resin and preferably 30–50% is insoluble in acetone and the Shore Durometer Hardness (A Scale) is in a range of 10–90.

In accordance with the invention, the novel polyester resin can be gelled to a flexible, non-tacky B-stage at temperatures up to 60° C. The resultant gelled or B-stage resin may be stored at room temperature for periods ranging from 3 days to many months without losing its flexibility. However, the resin rapidly cures when subject to elevated temperatures; i.e. 70° C. or higher. The storage time of the gelled or B-stage resin may be extended even further by storing the B-stage resin at reduced temperatures (15–20° C.).

The invention will be more clearly understood by referring to the attached flow sheet and the following examples.

Example I

To 70 parts by weight Koplac 2000 (a commercially available polyester of acid number 20–30 made by condensing phthalic anhydride and maleic anhydride with propylene glycol in mole ratios of 1:1:2.2( was added 20 parts by weight monomeric styrene and 10 parts by weight 3-methyl-1,4,6-heptatriene to form an unsaturated polyester resin. A portion of the resin was set aside to demonstrate the effect of room temperature while a second portion of the resin was heated to 60° C. The heated portion gelled in 3 hours. The room temperature portion slowly gained in viscosity from an initial viscosity of 2,200 cps. to 9,600 cps. after 2 days (measured at 24° C. with a Brookfield Model LVT Syncro-lectric viscometer). The room temperature portion gelled in 3 days. In both cases, the result was a crumbly, gummy product which upon curing ½" cubes were cut from each portion and cured for 3–5 minutes at 120° C. to yield a completely cured product having a 10–25 Barcol hardness. The remainder of each portion was then stored for 10 months, to determine shelf life. The portions, when examined after 10 months, were still flexible and gummy.

Example II

A mixture of 70 parts by weight Koplac 2000, 20 parts by weight monomeric styrene and 10 parts by weight 3-methyl-1,4,6-heptatriene was prepared to form an unsaturated polyester resin identical to that of Example I. To this resin, was added 1% by weight di-t-butyl peroxide catalyst. The resin was poured into a flat pan to a thickness of ⅛" and heated to 60° C. The resin gelled in 3 hours. The gelled resin was cut into 8" x 8" samples and the samples were cured for 4 minutes at 108° C.

The physical properties of the cured samples are tabulated below:

TABLE I

| | |
|---|---|
| Barcol | 50 |
| Flexural strength (p.s.i.) | 12,700 |
| Modulus ($10^{-6}$) | .691 |
| Tensile strength (p.s.i.) | 6,940 |
| Modulus ($10^{-6}$) | .514 |
| Elongation (percent) | 1.5 |
| Compressive strength (p.s.i.) | 17,700 |
| Modulus ($10^{-6}$) | .509 |
| HDT (° F.) | 175 |
| Izod impact (ft.-lb./in.) | .33 |

Example III

To a mixture of 70 parts by weight Koplac 3000 (a commercially available polyester of acid number 16–28 made by condensing phthalic anhydride and maleic anhydride with propylene glycol in mole ratios of 1:2:3.3) and 30 parts by weight 3-methyl-1,4,6-heptatriene was added 1% by weight di-tertiary-butyl peroxide catalyst. The resultant polyester resin mixture was heated to 60° C. until it gelled (about 2½ hours). The gelled resin was then cooled to room temperature and stored at room temperature for 48 hours. The gelled resin was then re-examined and found to be still in a flexible state or B-stage. The gelled resin was then cured for 3 minutes at 110° C. The Barcol hardness of the fully cured resin was 45–50.

Thus, the invention provides an unsaturated polyester resin capable of rapidly gelling to a flexible, non-tacky B-stage which may then be stored while in the B-stage, yet rapidly cured when subject to elevated temperatures. The resin may be applied to a glass fiber mat and quickly gelled and the mat then stored for an extended period of time before being molded and cured into a shaped product.

Thus, the use of preforms is eliminated as well as the attendant mess of coating the irregular-shaped preform with a liquid resin. Glass fiber mats coated with the resin of the invention may be easily handled and charged to molding machines. More positive control of the amount of charge as well as the shape of the charge can best be maintained resulting in higher quality molded products.

What is claimed is:

1. A curable solidified polyester resin which has been exposed to temperatures not exceeding 60° C. comprising the partial copolymerization product of:
   (a) 50–90% by weight the condensation product of:
      (1) at least one dicarboxylic acid having alpha, beta-ethylenic unsaturation polyesterfied with
      (2) at least one dihydric alcohol; and
   (b) 10–50% by weight of 3-methyl-1,4,6-heptatriene said solidified polyester being curable by subsequent exposure to a temperature of about 70° C. to fully-cured copolymerized product.

2. The polyester resin of claim 1 wherein a free radical generating catalyst inactive below 70° C. is present in the resin.

3. A curable solidified polyester resin which has been exposed to temperatures not exceeding 60° C. comprising the partial copolymerization products of:
   (a) 50–90% by weight the condensation product of:
      (1) at least one dicarboxylic acid having alpha, beta-ethylenic unsaturation polyesterfied with
      (2) at least one dihydric alcohol; and
   (b) 10–50% by weight of a mixture of styrene and 3-methyl-1,4,6-heptatriene where in at least 10% by weight of the 3-methyl-1,4,6-heptatriene must be used.

4. The polyester resin of claim 3 wherein a free radical generating catalyst mixture below 70° C. is present in the resin.

References Cited
UNITED STATES PATENTS

| | | | |
|---|---|---|---|
| 3,079,368 | 2/1963 | Lundberg | 260—75 |
| 3,377,407 | 4/1968 | Kressin | 260—863 |

WILLIAM H. SHORT, Primary Examiner

E. A. NIELSEN, Assistant Examiner

U.S. Cl. X.R.

161—170